United States Patent
Hedén et al.

(10) Patent No.: US 10,972,944 B2
(45) Date of Patent: Apr. 6, 2021

(54) MBMS CARRIER TYPE IN SYSTEM INFORMATION

(71) Applicant: Telefonaktiebolaget LM Ericsson (publ), Stockholm (SE)

(72) Inventors: Karin Hedén, Sundbyberg (SE); Jens Bergqvist, Linköping (SE); Helka-Liina Määttanen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/340,780

(22) PCT Filed: Oct. 11, 2017

(86) PCT No.: PCT/IB2017/056289
§ 371 (c)(1),
(2) Date: Apr. 10, 2019

(87) PCT Pub. No.: WO2018/069848
PCT Pub. Date: Apr. 19, 2018

(65) Prior Publication Data
US 2020/0045589 A1    Feb. 6, 2020

Related U.S. Application Data

(60) Provisional application No. 62/406,439, filed on Oct. 11, 2016.

(51) Int. Cl.
*H04W 36/00*    (2009.01)
*H04W 4/06*    (2009.01)
*H04W 36/08*    (2009.01)

(52) U.S. Cl.
CPC ......... *H04W 36/0007* (2018.08); *H04W 4/06* (2013.01); *H04W 36/0072* (2013.01); *H04W 36/08* (2013.01)

(58) Field of Classification Search
CPC . H04W 4/06; H04W 36/0007; H04W 36/072; H04W 36/08
See application file for complete search history.

(56) References Cited

U.S. PATENT DOCUMENTS

2013/0039250 A1    2/2013 Hsu
2013/0051305 A1    2/2013 Kuo
(Continued)

FOREIGN PATENT DOCUMENTS

CN    101247543    8/2008
CN    101262635    9/2008
(Continued)

OTHER PUBLICATIONS

"LS regarding agreements for FeMBMS," 3GPP TSG RAN WG1 Meeting #86, R1-168200, Gothenburg, Sweden, Aug. 22-26, 2016 (Year: 2016).*
(Continued)

*Primary Examiner* — Brian P Cox
(74) *Attorney, Agent, or Firm* — Baker Botts, LLP

(57) ABSTRACT

According to some embodiments, a method for use in a user equipment of performing cell reselection to a cell providing multimedia broadcast multicast service (MBMS) comprises: receiving a system information message comprising an indication of whether one or more carrier frequencies support MBMS carrier type or further enhanced MBMS (FeMBMS) carrier type; selecting, based on a capability of the user equipment and the carrier type of the one or more carrier frequencies, a carrier frequency for cell reselection; and camping on the selected carrier frequency. In particular embodiments, the system information message further comprises, for each of the one or more carrier frequencies, an indication of a percentage (e.g., 100%, 80%, etc.) of avail-
(Continued)

able multicast broadcast single frequency network (MBSFN) subframes in each radio frame.

14 Claims, 5 Drawing Sheets

(56) References Cited

U.S. PATENT DOCUMENTS

| | | | |
|---|---|---|---|
| 2013/0258934 A1 | 10/2013 | Amerga et al. | |
| 2014/0241180 A1* | 8/2014 | Amerga | H04W 36/0007 370/252 |
| 2016/0073302 A1 | 3/2016 | Yang et al. | |
| 2017/0339606 A1* | 11/2017 | Kim | H04W 36/0061 |

FOREIGN PATENT DOCUMENTS

| | | |
|---|---|---|
| CN | 101296028 | 10/2008 |
| CN | 101536406 | 9/2009 |
| CN | 101076176 | 11/2017 |
| EP | 2 882 245 A1 | 6/2015 |
| RU | 2006 105 411 A | 8/2004 |
| RU | 2014 110 046 A | 9/2015 |
| WO | WO2008100070 | 8/2008 |
| WO | 2010 110584 A2 | 9/2010 |
| WO | 2014 183279 A1 | 11/2014 |

OTHER PUBLICATIONS

Nokia et al., "eMBMS cell support of PSS/SSS/PBCH," 3GPP TSG RAN WG1 Meeting #86, Gothenburg, Sweden, Aug. 22-26, 2016 (Year: 2016).*

PCT International Search Report for International application No. PCT/IB2017/056289—dated Jan. 12, 2018.

PCT Written Opinion of the International Searching Authority for International application No. PCT/IB2017/056289—dated Jan. 12, 2018.

3GPP TSG RAN WG1 Meeting #86; Gothenburg, Sweden; Source: Nokia, Alcatel-Lucent Shanghai Bell; Title: eMBMS cell support PSS/SSS/PBCH (R1-167789)—Aug. 22-26, 2016.

3GPP TSG-RAN WG1 Meeting #86bis: Lisbon, Portugal; Source: Ericsson; Title Synchronization and acquisition of system information for FeMBMS (R1-1609677)—Oct. 10-14, 2016.

3GPP TSG-RAN WG2 #95; Gothenburg, Sweden; Source: Ericsson, Qualcomm Incorporated; Title: Overview on Rel-14 eMBMS (Tdoc R2-165480)—Aug. 22-26, 2016.

3GPP TSG RAN Meeting #73; New Orleans, LA, USA; Status Report to TSG; Work Item Name: eMBMS enhancements for LTE (RP-161490)—Sep. 19-22, 2016.

Russian Search Report issued for Application No. 2019113760/07(026549)—dated Nov. 25, 2019.

3GPP TSG RAN WG1 Meeting #86bis, R1-1609348, "Considerations on increased number Of MBSFN subframes," Huawei, HiSilicon, Oct. 10-14, 2016, 5 pages.

3GPP TSG-RAN WG2 #95bis, R2-167055, "Consideration on camping on FeMBMS carrier," LG Electronics Inc., Oct. 10-14, 2016, 2 pages.

3GPP TSG-RAN WG2 #95bis, R2-166936, "FeMBMS Sysem Information," Ericsson, Oct. 10-14, 2016, 4 pages.

Office Action and Search Report from China Patent Office in China Application No. 201780076535.9, dated Jan. 6, 2021, 12 pages (not translated).

* cited by examiner

MBMS CARRIER TYPE IN SYSTEM INFORMATION

PRIORITY

This nonprovisional application is a U.S. National Stage Filing under 35 U.S.C. § 371 of International Patent Application Serial No. PCT/IB2017/056289 filed Oct. 11, 2017 and entitled "MBMS Carrier Type in System Information" which claims priority to U.S. Provisional Patent Application No. 62/406,439 filed Oct. 11, 2016 both of which are hereby incorporated by reference in their entirety.

TECHNICAL FIELD

Particular embodiments are directed to wireless communications and, more particularly, to an indication of multimedia broadcast multicast service (MBMS) carrier type in system information (SI).

BACKGROUND

Evolved multimedia broadcast multicast service (eMBMS) provides an efficient way to deliver traditional downloads as well as streaming content to multiple users over a point-to-multipoint channel. This is especially useful for mobile streaming traffic, which may generate a major volume of network data traffic in the future.

The commercial deployment of eMBMS or "LTE Broadcast" is generating increasing interest. To meet the industry's and operators' demand for optimized delivery of file and streaming content, eMBMS may be enhanced even further. One area to improve is the system capacity—specifically, providing more MBSFN (Multicast Broadcast Single Frequency Network) subframes and less control overhead.

The current allocation of MBSFN subframes is limited to subframes 1, 2, 3, 6, 7, 8 (FS1) and 3, 4, 7, 8, 9 (FS2). Extended MBSFN subframe allocation, however, is desirable for particular scenarios (e.g., when increased MBMS capacity is needed, for example, to broadcast many television channels or to broadcast high resolution content). The upper limit of 100% allocation may be required when eMBMS is deployed on a supplementary downlink (SDL) carrier. To avoid wasting uplink capacity on a frequency division duplex (FDD) uplink/downlink carrier pair, all eMBMS traffic may be concentrated on as few SDL carriers as possible. A 100% allocation of MBSFN subframes is especially useful when the targeted spectrum is restricted (e.g., by regulatory requirements) to broadcast services only, such as the UHF band.

A reason that subframes 0, 4, 5, 9 (FS1) and 0, 1, 5, 6 (FS2) currently cannot be used for MBSFN is that they carry primary synchronization signal (PSS)/secondary synchronization signal (SSS)/physical broadcast channel (PBCH) and paging messages. Because MBMS allocations are full-bandwidth (i.e., all physical resource blocks (PRBs) are allocated), PSS/SSS/PBCH and paging messages cannot be frequency multiplexed with the physical multicast channel (PMCH).

For carrier types with up to 100% MBSFN subframe allocation, the carrier may have new properties. One property is the possibility of 100% MBSFN subframe allocation, which means that PSS/SSS/cell-specific resource signal (CRS) and PBCH are not sent on legacy position. It further means that system information cannot be sent the legacy way, which may change the master information block (MIB), system information (SI) message, and system information block (SIB) structures. The periodicity for sending PSS/SSS/CRS resembles the already existing discovery reference signal.

To provide service continuity for MBMS reception, mobility procedures for MBMS reception are used. The mobility procedures enable the user equipment (UE) to start or continue receiving MBMS services when changing frequency (see, e.g., TS 36.300, Chapter 15.4).

UEs that are receiving or interested in receiving MBMS service(s) in RRC IDLE state may obtain information about a neighbor frequency's multicast traffic channel (MTCH) from the multicast control channel (MCCH) of the neighbor frequency. To avoid a need to read MBMS related system information and potentially MCCH on neighbor frequencies, a UE may learn which MBMS service is provided via which frequency through MBMS assistance information.

The assistance information is a combination of the available information in the user service description (USD) of the UE and information broadcasted in system information block 15 (SIB15). The USD includes, for example, temporary mobile group identity (TMGI) of service, session start and end time, and the MBMS service area identities (SAIs). The MBMS SAIs for serving and neighboring frequencies are given in system information block 15. The size of SIB15 can be as big as 992 octets, but all information elements are optional.

By using the MBMS assistance information, USD combined with SIB15, a UE can continue to receive MBMS services when changing frequency because the UE may prioritize a frequency based on the possibility to receive MBMS while camping on that frequency/cell (see, e.g., TS 36.304).

SUMMARY

When an evolved Multimedia Broadcast Multicast Service (eMBMS) carrier is deployed, a user equipment (UE) needs to be able to determine that the carrier supports eMBMS. For cell re-selection, the UE can read assisting information from broadcast system information, such as system information block 5 (SIB5) and from system information block 15 (SIB15).

The information element (IE) SystemInformationBlockType5(SIB5) contains information relevant for inter-frequency cell re-selection (e.g., information about other evolved UMTS terrestrial radio access (E-UTRA) frequencies and inter-frequency neighboring cells relevant for cell re-selection). The IE includes cell re-selection parameters common for a frequency, as well as cell specific re-selection parameters. The IE SystemInformationBlockType15 contains the MBMS Service Area Identities (SAI) of the current and/or neighboring carrier frequencies.

For pre-Rel-14 UEs, SIB5 may list cells on further enhanced MBMS (FeMBMS) frequency that are barred (i.e., legacy UEs should not attempt to access or camp the FeMBMS frequency). For Rel-14 UEs, current SIB5 and SIB15 do not provide means to indicate a frequency is a special FeMBMS frequency or to give any assisting information for accessing the frequency.

To address these issues, particular embodiments include additional information in, for example, System Information (SIB15 and/or SIB5) to indicate that a neighbor frequency is of a certain type. For example, the additional information may include, without limitation, the possibility of 100% (or any other suitable percentage) multicast broadcast single frequency network (MBSFN) subframe allocation, which means a different periodicity for subframes containing primary synchronization signal (PSS)/secondary synchronization signal (SSS)/cell-specific reference signal (CRS)/physical broadcast channel (PBCH), possibly different physical resources for physical broadcast Channel (PBCH). The additional information may include an indication that the carrier has different master information block message and/or system information message structure and scheduling.

According to certain embodiments, a method is performed by a node in a communication network for signaling certain properties and/or capabilities of a carrier frequency to be used and/or prioritized by the user equipment.

According to additional embodiments, a method is performed by a user equipment in a communication network for receiving certain properties and/or capabilities of a carrier frequency. The method further comprises selecting a carrier frequency to be used and/or prioritized by the UE based on the received properties and/or capabilities.

According to additional embodiments, a node in a communication network is disclosed. The node comprises processing circuitry configured to signal certain properties and/or capabilities of a carrier frequency to be used and/or prioritized by a user equipment.

According to additional embodiments, a user equipment in a communication network is disclosed. The UE comprises processing circuitry configured to receive certain properties and/or capabilities of a carrier frequency. The processing circuitry is further configured to select and/or prioritize a carrier frequency to be used by the UE based on the received properties and/or capabilities.

According to some embodiments, a method for use in a user equipment of performing cell reselection to a cell providing MBMS comprises: receiving a system information message comprising an indication of whether one or more carrier frequencies support MBMS carrier type or FeMBMS carrier type; selecting, based on a capability of the user equipment and the carrier type of the one or more carrier frequencies, a carrier frequency for cell reselection; and camping on the selected carrier frequency.

In particular embodiments, the system information message further comprises, for each of the one or more carrier frequencies, an indication of a percentage (e.g., 100%, 80%, etc.) of available MBSFN subframes in each radio frame.

In particular embodiments, the system information message further comprises, for each of the one or more carrier frequencies, an indication of a periodicity of at least one of a PSS, SSS, CRS, and a PBCH. The method may further comprise configuring the user equipment to receive at least one of the PSS, SSS, CRS, and PBCH based on the indication of the periodicity of the at least one PSS, SSS, CRS, and PBCH.

In particular embodiments, selecting the carrier frequency for cell reselection comprises selecting a carrier frequency that supports FeMBMS when the user equipment is capable of FeMBMS, and selecting a carrier frequency that supports MBMS when the user equipment is not capable of FeMBMS. The system information message may comprise SIB15.

According to some embodiments, a user equipment capable of performing cell reselection to a cell providing MBMS comprises processing circuitry operable to: receive a system information message comprising an indication of whether one or more carrier frequencies support MBMS carrier type or FeMBMS carrier type; select, based on a capability of the user equipment and the carrier type of the one or more carrier frequencies, a carrier frequency for cell reselection; and camp on the selected carrier frequency.

In particular embodiments, the system information message further comprises, for each of the one or more carrier frequencies, an indication of a percentage (100%, 80%, etc.) of available MBSFN subframes in each radio frame.

In particular embodiments, the system information message further comprises, for each of the one or more carrier frequencies, an indication of a periodicity of at least one of a PSS, SSS, CRS, and a PBCH. The processing circuitry may be further operable to configure the user equipment to receive at least one of the PSS, SSS, CRS, and PBCH based on the indication of the periodicity of the at least one PSS, SSS, CRS, and PBCH.

In particular embodiments, the processing circuitry selects the carrier frequency for cell reselection by selecting a carrier frequency that supports FeMBMS when the user equipment is capable of FeMBMS, and selecting a carrier frequency that supports MBMS when the user equipment is not capable of FeMBMS. The system information message may comprise SIB15.

According to some embodiments, a method for use in a network node of signaling MBMS features of a cell comprises: obtaining MBMS carrier type information for carrier frequencies; and transmitting, to one or more UEs, a system information message comprising an indication of whether one or more carrier frequencies support MBMS carrier type or FeMBMS carrier type.

In particular embodiments, the system information message further comprises, for each of the one or more carrier frequencies, an indication of a percentage (e.g., 100%, 80%, etc.) of available MBSFN subframes in each radio frame.

In particular embodiments, the system information message further comprises, for each of the one or more carrier frequencies, an indication of a periodicity of at least one of a PSS, SSS, CRS, and a PBCH. The system information message may comprise SIB15.

According to some embodiments, a network node capable of signaling MBMS features of a cell comprises processing circuitry operable to: obtain MBMS carrier type information for carrier frequencies; and transmit, to one or more user UEs, a system information message comprising an indication of whether one or more carrier frequencies support MBMS carrier type or FeMBMS carrier type.

In particular embodiments, the system information message further comprises, for each of the one or more carrier frequencies, an indication of a percentage (e.g., 100%, 80%, etc.) of available MBSFN subframes in each radio frame.

In particular embodiments, the system information message further comprises, for each of the one or more carrier frequencies, an indication of a periodicity of at least one of a PSS, SSS, CRS, and a PBCH. The system information message may comprise SIB15.

According to some embodiments, a user equipment capable of performing cell reselection to a cell providing MBMS comprises a receiving module and a selecting module. The receiving module is operable to receive a system information message comprising an indication of whether one or more carrier frequencies support MBMS carrier type or FeMBMS carrier type. The selecting module is operable to: select, based on a capability of the user equipment and the carrier type of the one or more carrier frequencies, a carrier frequency for cell reselection; and camp on the selected carrier frequency.

According to some embodiments, a network node capable of signaling MBMS features of a cell comprises an obtaining module and a transmitting module. The obtaining module is operable to obtain MBMS carrier type information for carrier frequencies. The transmitting module is operable to transmit, to one or more UEs, a system information message comprising an indication of whether one or more carrier frequencies support MBMS carrier type or FeMBMS carrier type.

Also disclosed is a computer program product. The computer program product comprises instructions stored on non-transient computer-readable media which, when executed by a processor, perform the steps of: receiving a system information message comprising an indication of whether one or more carrier frequencies support MBMS carrier type or FeMBMS carrier type; selecting, based on a capability of the user equipment and the carrier type of the one or more carrier frequencies, a carrier frequency for cell reselection; and camping on the selected carrier frequency.

Another computer program product comprises instructions stored on non-transient computer-readable media which, when executed by a processor, perform the steps of: obtaining MBMS carrier type information for carrier frequencies; and transmitting, to one or more UEs, a system information message comprising an indication of whether one or more carrier frequencies support MBMS carrier type or FeMBMS carrier type.

Particular embodiments may exhibit some of the following technical advantages. For example, by adding information about certain properties of a neighbor frequency in system information, a UE that does not support the indicated property may avoid measuring and/or listening to such a carrier. This may facilitate the UE conserving various resources that would otherwise be wasted measuring and/or listening to particular carriers. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
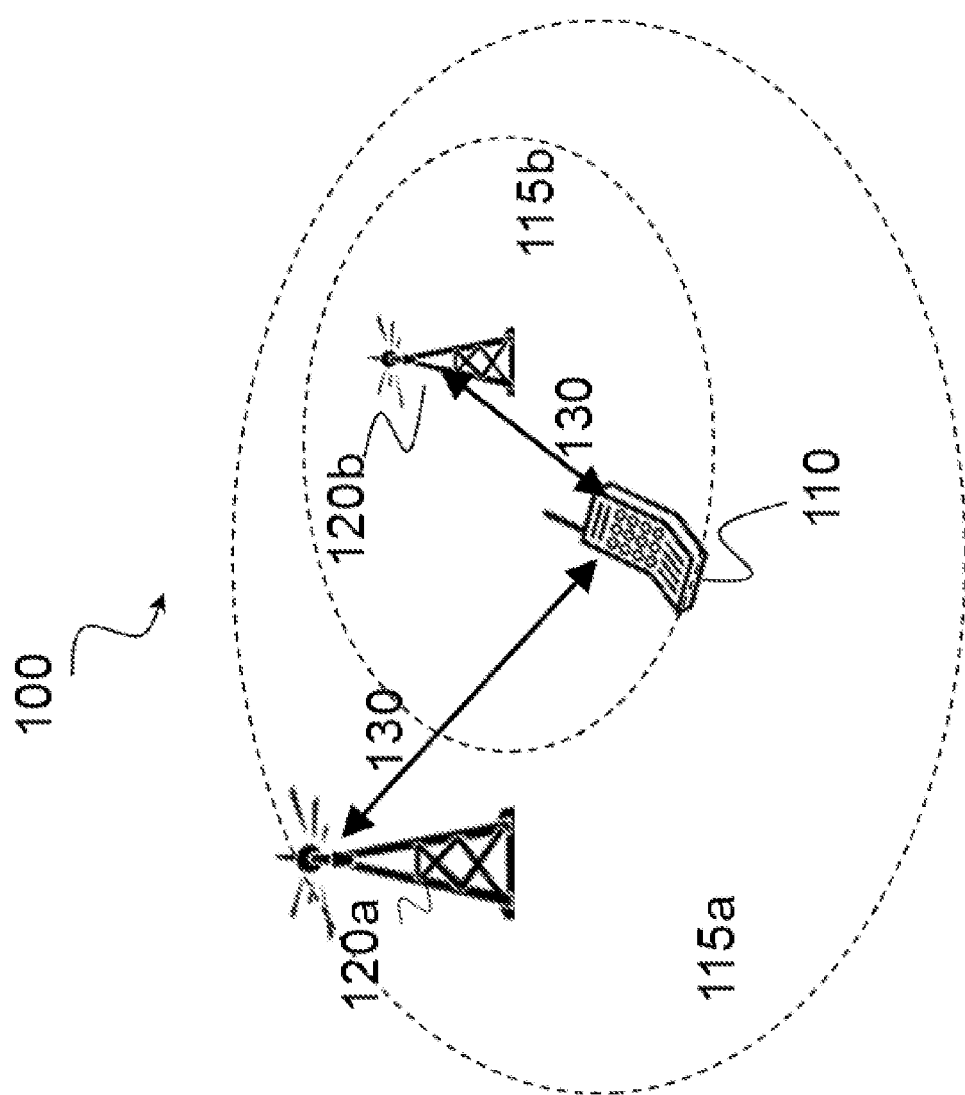
FIG. 1 is a block diagram illustrating an example wireless network, according to some embodiments.

Evolved multimedia broadcast multicast service (eMBMS) delivers traditional downloads and streaming content to multiple users over a point-to-multipoint channel. To meet the industry's and operators' demand for optimized delivery of file and streaming content, eMBMS may be enhanced even further. One area to improve is the system capacity-specifically, providing more MBSFN (Multicast Broadcast Single Frequency Network) subframes and less control overhead.

Extended MBSFN subframe allocation is desirable for particular scenarios (e.g., when increased MBMS capacity is needed, for example, to broadcast many television channels or to broadcast high resolution content). The upper limit of 100% allocation may be required when eMBMS is deployed on a supplementary downlink (SDL) carrier. A 100% allocation of MBSFN subframes is especially useful when the targeted spectrum is restricted (e.g., by regulatory requirements) to broadcast services only, such as the UHF band.

For carrier types with up to 100% MBSFN subframe allocation, the carrier may have new properties. One property is the possibility of 100% MBSFN subframe allocation, which means that primary synchronization signal (PSS)/secondary synchronization signal (SSS)/cell-specific resource signal (CRS) and physical broadcast channel (PBCH) are not sent in their legacy positions. It further means that system information cannot be sent the legacy way, which may change the master information block (MIB), system information (SI) message, and system information block (SIB) structures.

To provide service continuity for MBMS reception, mobility procedures for MBMS reception are used. UEs that are receiving or interested in receiving MBMS service(s) may obtain information about a neighbor frequency's multicast traffic channel (MTCH) from the multicast control channel (MCCH) of the neighbor frequency. To avoid a need to read MBMS related system information and potentially MCCH on neighbor frequencies, a UE may learn which MBMS service is provided via which frequency through MBMS assistance information.

The assistance information is a combination of the available information in the user service description (USD) of the UE and information broadcasted in system information block 15 (SIB15). The USD includes, for example, temporary mobile group identity (TMGI) of service, session start and end time, and the MBMS service area identities (SAIs). The MBMS SAIs for serving and neighboring frequencies are given in system information block 15. The size of SIB15 can be as big as 992 octets, but all information elements are optional.

By using the MBMS assistance information, USD combined with SIB15, a UE can continue to receive MBMS services when changing frequency because the UE may prioritize a frequency based on the possibility to receive MBMS while camping on that frequency/cell (see, e.g., TS 36.304).

Particular embodiments described herein include additional information in, for example, SIB15 and/or SIB5 to indicate that a neighbor frequency is of a certain type. For example, the additional information may include, without limitation, the possibility of 100% (or any other suitable percentage) MBSFN subframe allocation, which means a different periodicity for subframes PSS/SSS/CRS/PBCH, possibly different physical resources for PBCH. The additional information may include an indication that the carrier has different master information block message and/or system information message structure and scheduling.

By adding information about certain properties of a neighbor frequency in system information, a UE that does not support the indicated property may avoid measuring and/or listening to such a carrier in some embodiments. This may facilitate the UE conserving various resources that would otherwise be wasted measuring and/or listening to particular carriers.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-5B of the drawings, like numerals being used for like and corresponding parts of the various drawings. LTE and 5G NR are used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may include frames and subframes. Network node 120 may dynamically schedule subframes as an uplink subframe, a downlink subframe, or a combination uplink and downlink subframe.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, networks 115 may include MBMS, eMBMS, or FeMBMS carrier frequencies. Wireless device 110 may support one or several of MBMS, eMBMS and FeMBMS. Before moving from one network 115 to another network 115, wireless device 110 may determine whether network 115 supports MBMS or FeMBMS.

According to some embodiments, wireless device 110 may perform cell reselection by receiving a system information message (e.g., SIB5, SIB15, etc.) comprising an indication of whether one or more carrier frequencies (e.g., the carrier frequency of the serving network 115 or neighboring network 115) support MBMS carrier type or FeMBMS carrier type. Wireless device 110 may select, based on its own capabilities (e.g., MBMS, FeMBMS, etc.) and the carrier type of the one or more carrier frequencies, a carrier frequency for cell reselection. For example, if wireless device 110 supports FeMBMS and network node 120b supports FeMBMS, then wireless device 110 may select a carrier frequency of network 115 for cell reselection. Wireless device 110 may camp on the selected carrier frequency.

In particular embodiments, the system information message further comprises, for each of the one or more carrier frequencies, an indication of a percentage (100%, 80%, etc.) of available MBSFN subframes in each radio frame. For example, of the available MBSFN subframes, some carrier types may use 100% of the available MBSFN subframes for multimedia broadcast. Another carrier type may use 80% of the available MBSFN subframes and allow unicast in the other 20% of available subframes.

Available MBSFN subframes refer to subframes available for multimedia broadcast. For example, in some embodiments one out of every four subframes may be used for PSS, SSS, PBCH, CRS, etc. Three of the four subframes may be used for multimedia broadcast. Thus, a 100% carrier type uses all three available MBSFN subframes for multimedia broadcast. A lower percentage may use fewer subframes for multimedia broadcast.

In particular embodiments, the system information message further comprises, for each of the one or more carrier frequencies, an indication of a periodicity of at least one of a PSS, SSS, CRS, and a PBCH. Wireless device 110 may receive at least one of the PSS, SSS, CRS, and PBCH based on the indication of the periodicity of the at least one PSS, SSS, CRS, and PBCH.

According to some embodiments, network node 120 may signal MBMS features of a cell by obtaining MBMS carrier type information for carrier frequencies. For example, network node 120 may determine its own MBMS carrier type(s), and the MBMS carrier type(s) of neighboring nodes. In other embodiments, the MBMS information may include information in addition to carrier type(s), such a reference signal periodicity, percentage of MBSFN subframes used for multimedia broadcast, etc. Network node 120 may transmit, to one or more wireless devices 110, a system information message (e.g., SIB5, SIB15, etc.) comprising an indication of whether one or more carrier frequencies support, for example, MBMS carrier type or FeMBMS carrier type.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 4A below. Similarly, a network node may include any suitable combination of hardware and/or software. For example, in particular embodiments, a network node, such as network node 120, may include the components described with respect to FIG. 5A below.

Particular embodiments include information in system information messages, such as SIB15. According to particular embodiments, when a UE that is interested in receiving, or is about to receive MBMS service(s), is performing cell re-selection, the UE reads (or has read earlier and is now using) the information in SIB15 to learn about the MBMS SAIs for serving and neighboring frequencies. The UE may perform a frequency-based cell re-selection. According to particular embodiments, the reselection may be based on the rules in TS 36.304.

By using the information in SIB15 about the properties of the neighbor frequency, the UE may acquire the needed SI faster or is able to acquire it in the first place. For Rel-14 UEs not supporting FeMBMS, the indication tells the UEs they should find the MBMS service elsewhere.

Particular embodiments may include one or more of the following types of information in SIB15 per carrier frequency: (a) an indication that the carrier has a 100% MBSFN subframe allocation; (b) a periodicity for PSS/SSS/CRS and/or PBCH subframes (e.g., similar to DRS assistance information defined in TS36.331 5.5.2.10 "discovery signals measurement timing configuration"); (c) an indication the carrier has different master information block message and/or system information message structure and scheduling, or any related details; and (d) an indication that the carrier has no L1/L2 control region.

In addition to the information listed above, the indication may be provided through a bit indication or by using, for example, an extension only applicable to UEs capable of the new property.

Particular embodiments include information in SIB5. According to particular embodiments, when a UE is performing cell re-selection, the UE reads the information provided in SIB5 to learn which neighbor frequencies exist. The UE may measure on indicated frequencies and select a frequency to camp on. According to particular embodiments, this may be based on the rules in TS 36.304. By using the information in SIB5 about the properties of the neighbor frequency, a UE not supporting such a property is prevented from trying to measure on such a carrier.

Particular embodiments may include one or more of the following types of information in SIB5 per carrier frequency: (a) an indication that the carrier has a 100% MBSFN subframe allocation; (b) a periodicity for PSS/SSS/CRS and/or PBCH subframes (e.g., similar to DRS assistance information defined in TS36.331 5.5.2.10 "discovery signals measurement timing configuration"); (c) an indication the carrier has different master information block message and/or system information message structure and scheduling, or any related details; and (d) an indication that the carrier has no L1/L2 control region.

In addition to information listed above, the indication can be given through a bit indication or by using, for example, an extension only applicable to UEs capable of the new property.

Particular embodiments include methods in a wireless device (such as a UE) and a network node (such as a eNB or gNB). Examples are illustrated in FIGS. 2 and 3.

Figure 2:
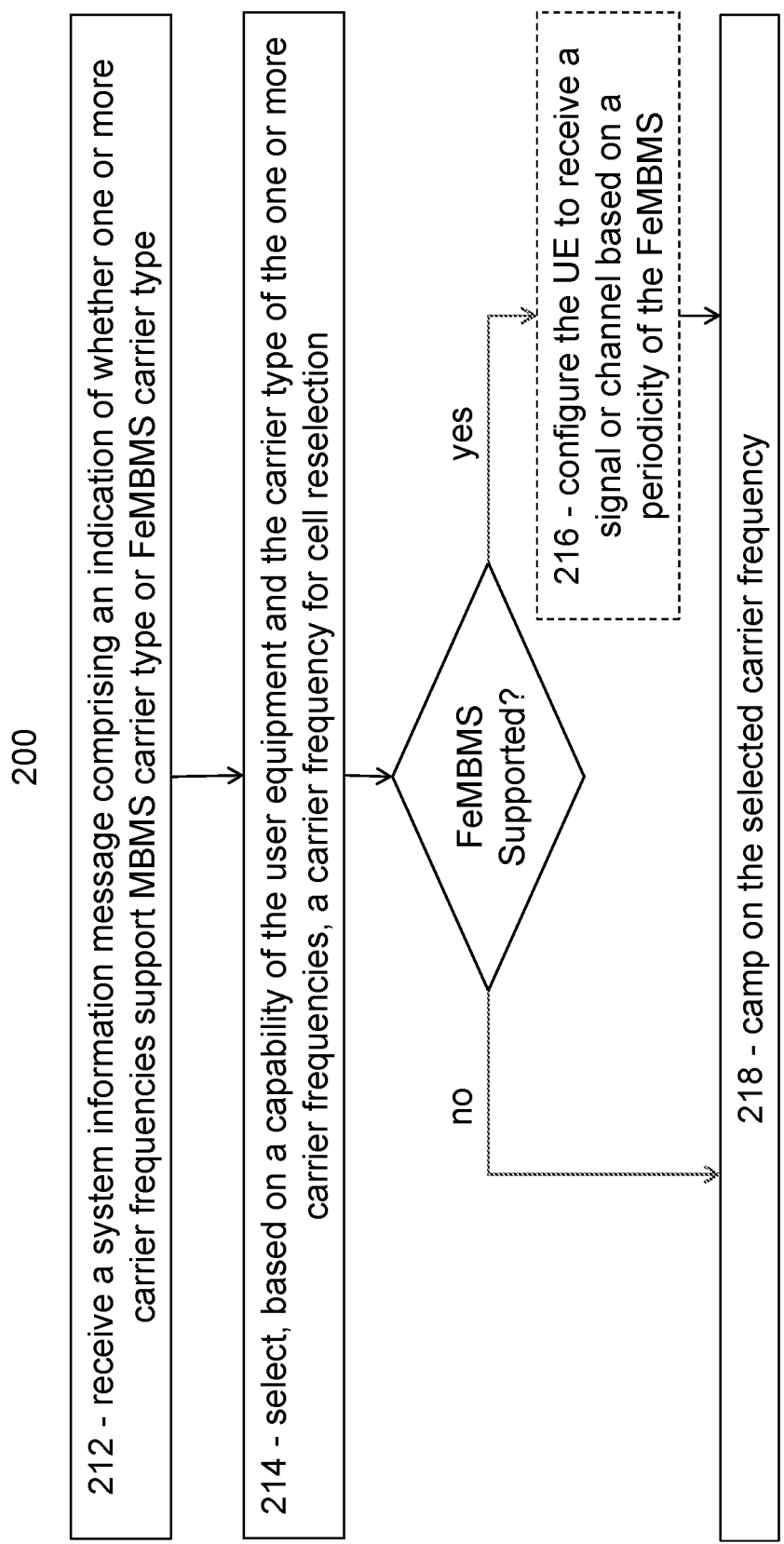
FIG. 2 is a flow diagram illustrating an example method in a wireless device, according to some embodiments.
Figure 3:
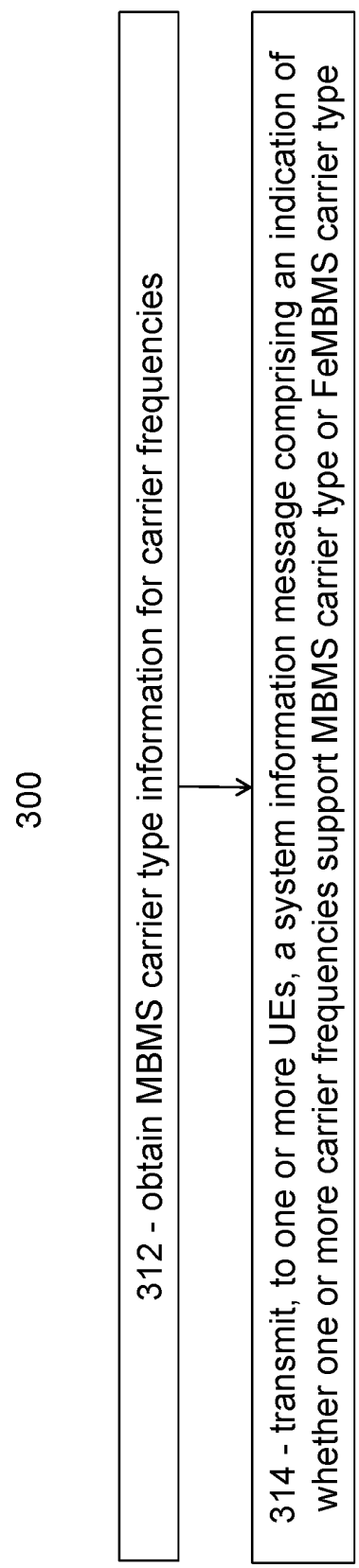
FIG. 3 is a flow diagram illustrating an example method in a network node, according to some embodiments.

FIG. 2 is a flow diagram illustrating an example method in a wireless device, according to some embodiments. The method includes performing cell reselection. In particular embodiments, one or more steps of FIG. 2 may be performed by wireless device 110 of wireless network 100 described with respect to FIG. 1.

The method begins at step 212, where the user equipment receives a system information message comprising an indication of whether one or more carrier frequencies support MBMS carrier type or FeMBMS carrier type. For example, wireless device 110 may receive a system information block (e.g., SIB5, SIB15, etc.) from network node 120. The system information message may include MBMS features of the serving network and/or neighbor networks. The MBMS features may be associated with particular carrier frequencies.

In particular embodiments, the system information message further comprises, for each of the one or more carrier frequencies, an indication of a percentage (100%, 80%, etc.) of available MBSFN subframes in each radio frame. For example, of the available MBSFN subframes, some carrier types may use 100% of the available MBSFN subframes for multimedia broadcast. Another carrier type may use 80% of the available MBSFN subframes and allow unicast in the other 20% of available subframes.

In particular embodiments, the system information message further comprises, for each of the one or more carrier frequencies, an indication of a periodicity of at least one of a PSS, SSS, CRS, and a PBCH. For example, every fourth subframe may include a PSS/SSS. In some embodiments, the system information may include additional information related to MBMS.

At step 214, the user equipment selects, based on a capability of the user equipment and the carrier type of the one or more carrier frequencies, a carrier frequency for cell reselection. For example, if wireless device 110 supports both eMBMS and FeMBMS, and network 115a supports an eMBMS carrier type and network 115b supports an FeMBMS carrier type, then wireless device 110 may select either carrier frequency.

As another example, if wireless device 110 only supports eMBMS, then wireless device 110 may select a carrier frequency of network 115a that supports an eMBMS carrier type. The method may continue to step 218, where the user equipment camps on the selected carrier frequency.

If the user equipment supports FeMBMS and the user equipment selects a FeMBMS carrier type, then the method may continue to step 216.

At step 216, the user equipment configures itself to reference a particular reference signal (e.g., PSS, SSS, CRS, etc.) or a particular channel (e.g., PBCH) according to periodicity or other information received in the system information message at step 212. The method then continues to step 218, where the user equipment camps on the selected carrier frequency.

Modifications, additions, or omissions may be made to method 200. Additionally, one or more steps in method 200 of FIG. 2 may be performed in parallel or in any suitable order. As one example, in particular embodiments step 16 may be performed before step 214 or after step 218. The steps of method 200 may be repeated over time as necessary.

FIG. 3 is a flow diagram illustrating an example method in a network node, according to some embodiments. In particular embodiments, one or more steps of FIG. 3 may be performed by network node 120 of wireless network 100 described with respect to FIG. 1.

The method begins at step 312, where a network node obtains MBMS carrier type information for carrier frequencies. For example, network node 120 may determine its own MBMS carrier type(s), and the MBMS carrier type(s) of neighboring nodes. In other embodiments, the MBMS information may include information in addition to carrier type(s), such a reference signal periodicity, percentage of MBSFN subframes used for multimedia broadcast, etc.

At step 314, the network node transmits, to one or more UEs, a system information message comprising an indication of whether one or more carrier frequencies support MBMS carrier type or FeMBMS carrier type. For example, network node 120 may transmit, to one or more wireless devices 110, a system information message (e.g., SIB5, SIB15, etc.) comprising an indication of whether one or more carrier frequencies (e.g., carrier frequencies of serving cell and/or neighbor cells) support, for example, MBMS carrier type or FeMBMS carrier type.

Modifications, additions, or omissions may be made to method 300. Additionally, one or more steps in method 300 of FIG. 3 may be performed in parallel or in any suitable order. The steps of method 300 may be repeated over time as necessary.

Figures 4A, 4B:
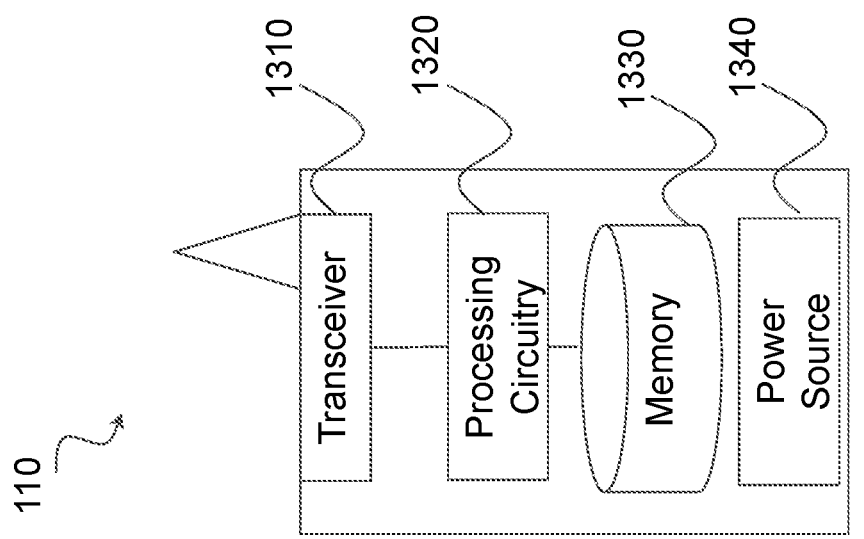
FIG. 4A is a block diagram illustrating an example embodiment of a wireless device.
FIG. 4B is a block diagram illustrating example components of a wireless device.

FIG. 4A is a block diagram illustrating an example embodiment of a wireless device. The wireless device is an example of the wireless devices 110 illustrated in FIG. 1. In particular embodiments, the wireless device is capable of receiving a system information message comprising an indication of whether one or more carrier frequencies support MBMS carrier type or FeMBMS carrier type; selecting, based on a capability of the user equipment and the carrier type of the one or more carrier frequencies, a carrier frequency for cell reselection; and camping on the selected carrier frequency.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1320 in communication with transceiver 1310 obtains a configuration for a plurality of frequency channels in unlicensed spectrum, and transmits or receives a data transmission according to a frequency-hopping pattern across the plurality of frequency channels.

Other embodiments of the wireless device may include additional components (beyond those shown in FIG. 4A) responsible for providing certain aspects of the wireless device's functionality, including any of the functionality described above and/or any additional functionality (including any functionality necessary to support the solution described above).

FIG. 4B is a block diagram illustrating example components of a wireless device 110. The components may include receiving module 1350 and selecting module 1352.

Receiving module 1350 may perform the receiving functions of wireless device 110. For example, receiving module 1350 may receive a system information message comprising an indication of whether one or more carrier frequencies support MBMS carrier type or FeMBMS carrier type, as described in any of the examples above. In certain embodiments, receiving module 1350 may include or be included in processing circuitry 1320. In particular embodiments, receiving module 1350 may communicate with selecting module 1352.

Selecting module 1352 may perform the selecting functions of wireless device 110. For example, selecting module 1352 may select, based on a capability of the user equipment and the carrier type of the one or more carrier frequencies, a carrier frequency for cell reselection. Selecting module 1352 may also camp on the selected carrier frequency. Selecting module 1352 may perform the selecting and camping according to any of the examples described above. In certain embodiments, selecting module 1352 may include or be included in processing circuitry 1320. In particular embodiments, selecting module 1352 may communicate with receiving module 1350.

Figure 5B:
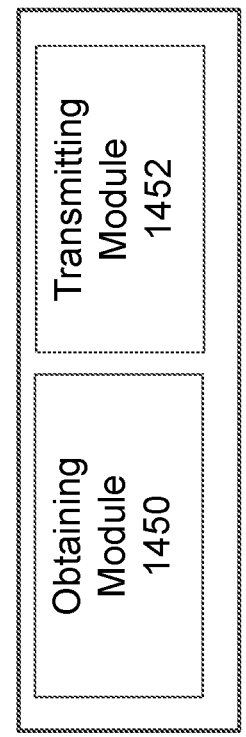
FIG. 5B is a block diagram illustrating example components of a network node.
Figure 5A:
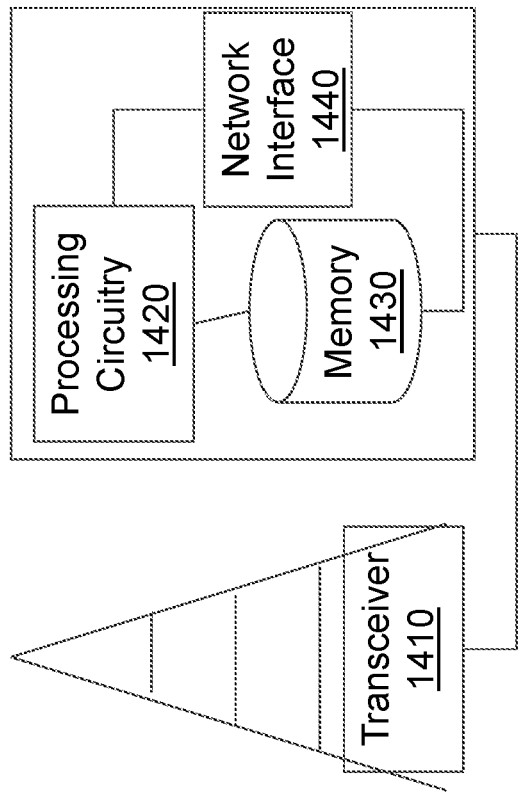
FIG. 5A is a block diagram illustrating an example embodiment of a network node.

FIG. 5A is a block diagram illustrating an example embodiment of a network node. The network node is an example of the network node 120 illustrated in FIG. 1. In particular embodiments, the network node is capable of obtaining MBMS carrier type information for carrier frequencies; and transmitting, to one or more UEs, a system information message comprising an indication of whether one or more carrier frequencies support MBMS carrier type or FeMBMS carrier type.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 4A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

Other embodiments of network node 120 include additional components (beyond those shown in FIG. 5A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 5B is a block diagram illustrating example components of a network node 120. The components may include obtaining module 1450 and transmitting module 1452.

Obtaining module 1450 may perform the obtaining functions of network node 120. For example, obtaining module 1450 may obtain MBMS carrier type information for carrier frequencies, as described in any of the examples above. In certain embodiments, obtaining module 1450 may include or be included in processing circuitry 1420. In particular embodiments, obtaining module 1450 may communicate with transmitting module 1452.

Transmitting module 1452 may perform the transmitting functions of network node 120. For example, transmitting module 1452 may transmit, to one or more UEs, a system information message comprising an indication of whether one or more carrier frequencies support MBMS carrier type or FeMBMS carrier type, according to any of the examples described above. In certain embodiments, transmitting module 1452 may include or be included in processing circuitry 1420. In particular embodiments, transmitting module 1452 may communicate with obtaining module 1450 and receiving module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
DL Downlink
eMBMS evolved Multimedia Broadcast Multicast Service
eNB Evolved NodeB
FDD Frequency Division Duplex
FeMBMS Further evolved Multimedia Broadcast Multicast Service
FH Frequency-Hopping
IoT Internet-of-Things
LAA License Assisted Access
LBT Listen-Before-Talk
LTE Long Term Evolution
LTE-U LTE in Unlicensed Spectrum
MAC Medium Access Control
M2M Machine to Machine
MCCH Multicast Control Channel
MIB Master Information Block
MIMO Multi-Input Multi-Output
MTC Machine Type Communication
MTCH Multicast Traffic Channel
NR New Radio
PBCH Physical Broadcast Channel
PDSCH Physical Downlink Shared Channel
PMCH Physical Multicast Channel
PRB Physical Resource Block PUCCH Physical Uplink Control Channel
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
RS Reference Signal
SCell Secondary Cell
SIB System Information Block
SIM Subscriber Identity Module
TDD Time Division Duplex
TMGI Temporary Mobile Group Identity
UE User Equipment
UL Uplink
UTRAN Universal Terrestrial Radio Access Network
WAN Wireless Access Network

The invention claimed is:

1. A method for use in a user equipment of performing cell reselection to a cell providing multimedia broadcast multicast service (MBMS), the method comprising:
receiving a system information message comprising an indication of whether one or more carrier frequencies support MBMS carrier type or further enhanced MBMS (FeMBMS) carrier type;
selecting, based on a capability of the user equipment and the carrier type of the one or more carrier frequencies, a carrier frequency for cell reselection, wherein when the user equipment is capable of FeMBMS, selecting a carrier frequency that supports FeMBMS and when the user equipment is not capable of FeMBMS, selecting a carrier frequency that supports MBMS; and
camping on the selected carrier frequency.

2. The method of claim 1, wherein the system information message further comprises, for each of the one or more carrier frequencies, an indication of a percentage of available multicast broadcast single frequency network (MBSFN) subframes in each radio frame.

3. The method of claim 2, wherein the percentage of available MBSFN subframes is 100 percent.

4. The method of claim 2, wherein the percentage of available MBSFN subframes is 80 percent.

5. The method of claim 1, wherein the system information message further comprises, for each of the one or more carrier frequencies, an indication of a periodicity of at least one of a primary synchronization signal (PSS), secondary synchronization signal (SSS), cell-specific reference signal (CRS), and a physical broadcast channel (PBCH).

6. The method of claim 5, further comprising configuring the user equipment to receive at least one of the PSS, SSS, CRS, and PBCH based on the indication of the periodicity of the at least one PSS, SSS, CRS, and PBCH.

7. The method of claim 1, wherein the system information message is SIB 15.

8. A user equipment capable of performing cell reselection to a cell providing multimedia broadcast multicast service (MBMS), the user equipment comprising processing circuitry operable to:
receive a system information message comprising an indication of whether one or more carrier frequencies support MBMS carrier type or further enhanced MBMS (FeMBMS) carrier type;
select, based on a capability of the user equipment and the carrier type of the one or more carrier frequencies, a carrier frequency for cell reselection, wherein when the user equipment is capable of FeMBMS, selecting a carrier frequency that supports FeMBMS and when the user equipment is not capable of FeMBMS, selecting a carrier frequency that supports MBMS; and
camp on the selected carrier frequency.

9. The user equipment of claim 8, wherein the system information message further comprises, for each of the one or more carrier frequencies, an indication of a percentage of available multicast broadcast single frequency network (MBSFN) subframes in each radio frame.

10. The user equipment of claim 9, wherein the percentage of available MBSFN subframes is 100 percent.

11. The user equipment of claim 9, wherein the percentage of available MBSFN subframes is 80 percent.

12. The user equipment of claim 8, wherein the system information message further comprises, for each of the one or more carrier frequencies, an indication of a periodicity of at least one of a primary synchronization signal (PSS), secondary synchronization signal (SSS), cell-specific reference signal (CRS), and a physical broadcast channel (PBCH).

13. The user equipment of claim 12, the processing circuitry further operable to configure the user equipment to receive at least one of the PSS, SSS, CRS, and PBCH based on the indication of the periodicity of the at least one PSS, SSS, CRS, and PBCH.

14. The user equipment of claim 8, wherein the system information message is SIB15.

* * * * *

UNITED STATES PATENT AND TRADEMARK OFFICE
CERTIFICATE OF CORRECTION

| | | |
|---|---|---|
| PATENT NO. | : 10,972,944 B2 | Page 1 of 2 |
| APPLICATION NO. | : 16/340780 | |
| DATED | : April 6, 2021 | |
| INVENTOR(S) | : Hedén et al. | |

It is certified that error appears in the above-identified patent and that said Letters Patent is hereby corrected as shown below:

On the Title Page

On Page 2, in Item (56), under "OTHER PUBLICATIONS", in Column 1, Line 2, delete "Sweden,Aug." and insert -- Sweden, Aug. --, therefor.

On Page 2, in Item (56), under "OTHER PUBLICATIONS", in Column 2, Line 26, delete "Sysem" and insert -- System --, therefor.

In the Specification

In Column 1, Line 63, delete "PSS/SSS/cell-specific resource signal" and insert -- PSS/SSS/cell-specific reference signal --, therefor.

In Column 2, Line 51, delete "(SAI)" and insert -- (SAIs) --, therefor.

In Column 6, Lines 12-13, delete "(SSS)/cell-specific resource signal (CRS)" and insert -- (SSS)/cell-specific reference signal (CRS) --, therefor.

In Column 7, Lines 56-57, delete "combination uplink" and insert -- combination of uplink --, therefor.

In Column 8, Line 25, delete "serving network 115" and insert -- serving network 120 --, therefor.

In Column 11, Line 59, delete "machine type (MTC)" and insert -- machine type communication (MTC) --, therefor.

In Column 12, Line 15, delete "one more" and insert -- one or more --, therefor.

In Column 12, Line 30, delete "and/or or any" and insert -- and/or any --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,972,944 B2

In the Claims

In Column 16, Line 8, in Claim 7, delete "SIB 15." and insert -- SIB15. --, therefor.